United States Patent
Hashimoto et al.

(10) Patent No.: US 12,080,868 B2
(45) Date of Patent: Sep. 3, 2024

(54) AIR ELECTRODE/SEPARATOR ASSEMBLY AND METAL-AIR SECONDARY BATTERY

(71) Applicant: NGK INSULATORS, LTD., Nagoya (JP)

(72) Inventors: Naomi Hashimoto, Nagoya (JP); Ozora Kano, Nagoya (JP); Naomi Saito, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 420 days.

(21) Appl. No.: 17/452,800

(22) Filed: Oct. 29, 2021

(65) Prior Publication Data

US 2022/0052399 A1    Feb. 17, 2022

Related U.S. Application Data

(63) Continuation of application No. PCT/JP2020/017831, filed on Apr. 24, 2020.

(30) Foreign Application Priority Data

Jun. 5, 2019   (JP) ................... 2019-105742
Sep. 25, 2019  (JP) ................... 2019-174428

(51) Int. Cl.
    *H01M 12/08*    (2006.01)
    *H01M 4/90*     (2006.01)
    *H01M 50/449*   (2021.01)

(52) U.S. Cl.
    CPC ......... *H01M 12/08* (2013.01); *H01M 4/9016* (2013.01); *H01M 50/449* (2021.01)

(58) Field of Classification Search
    CPC ...... H01M 12/08; H01M 12/04; H01M 12/06; H01M 50/449; H01M 50/446;
    (Continued)

(56) References Cited

U.S. PATENT DOCUMENTS 9,070,953 B2    6/2015   Yamada et al.
10,290,847 B2   5/2019   Kitoh et al.
(Continued)

FOREIGN PATENT DOCUMENTS

JP    2017-016901 A    1/2017
JP    2019-021518      2/2019
(Continued)

OTHER PUBLICATIONS

Chinese Office Action (with English translation) dated Jan. 30, 2024 (Application No. 202080040402.8).

(Continued)

*Primary Examiner* — Raymond Alejandro
(74) *Attorney, Agent, or Firm* — BURR PATENT LAW, PLLC

(57) ABSTRACT

Provided is an air electrode/separator assembly including a hydroxide ion conductive dense separator and an air electrode layer provided on one side of the hydroxide ion conductive dense separator. The air electrode layer includes: an internal catalyst layer provided closer to the hydroxide ion conductive dense separator and filled with a mixture containing a hydroxide ion conductive material, an electron conductive material, an organic polymer, and an air electrode catalyst (provided that the hydroxide ion conductive material may be the same material as the air electrode catalyst, and provided that the electron conductive material may be the same material as the air electrode catalyst); and an outermost catalyst layer provided away from the hydroxide ion conductive dense separator having a porosity of 60% or more, composed of a porous current collector and a layered double hydroxide (LDH) covering a surface thereof.

16 Claims, 7 Drawing Sheets

(58) Field of Classification Search
CPC ............. H01M 50/451; H01M 50/454; H01M 50/457; H01M 4/9016; H01M 4/9025
See application file for complete search history.

(56) References Cited

U.S. PATENT DOCUMENTS

| | | | |
|---|---|---|---|
| 10,483,596 B2 | 11/2019 | Hayashi et al. | |
| 10,892,530 B2 | 1/2021 | Yamamura et al. | |
| 2015/0079298 A1* | 3/2015 | Ferreira | C23C 22/12 423/595 |
| 2015/0238927 A1* | 8/2015 | O'Hare | B01J 20/08 502/414 |
| 2015/0364790 A1* | 12/2015 | Yonehara | H01M 10/30 429/316 |
| 2017/0077476 A1* | 3/2017 | Kitoh | H01M 10/28 |
| 2017/0214019 A1 | 7/2017 | Yokoyama et al. | |
| 2017/0260048 A1 | 9/2017 | Yamamoto et al. | |

FOREIGN PATENT DOCUMENTS

| | | |
|---|---|---|
| WO | 2013/073292 A1 | 5/2013 |
| WO | 2015/146671 A1 | 10/2015 |
| WO | 2016/067884 A1 | 5/2016 |
| WO | 2016/076047 A1 | 5/2016 |
| WO | 2016/084557 A1 | 6/2016 |
| WO | 2018/163353 A1 | 9/2018 |

OTHER PUBLICATIONS

International Search Report and Written Opinion (Application No. PCT/JP2020/017831) dated Jul. 14, 2020 (with English translation).

* cited by examiner

AIR ELECTRODE/SEPARATOR ASSEMBLY AND METAL-AIR SECONDARY BATTERY

CROSS-REFERENCE TO RELATED APPLICATIONS

This application is a continuation application of PCT/JP2020/017831 filed Apr. 24, 2020, which claims priority to Japanese Patent Application No. 2019-105742 filed Jun. 5, 2019 and Japanese Patent Application No. 2019-174428 filed Sep. 25, 2019, the entire contents all of which are incorporated herein by reference.

BACKGROUND OF THE INVENTION

1. Field of the Invention

The present disclosure relates to an air electrode/separator assembly and metal-air secondary battery.

2. Description of the Related Art

One of the innovative battery candidates is a metal-air secondary battery. In the metal-air secondary battery, oxygen as a positive electrode active material is supplied from the air, and the space inside the battery container can thus be utilized to the maximum extent for filling the negative electrode active material, whereby in principle a high energy density is realized. For example, in a zinc-air secondary battery, in which zinc is used as a negative electrode active material, an alkaline aqueous solution such as potassium hydroxide is used as an electrolyte, and a separator (partition membrane) is used to prevent a short circuit between positive and negative electrodes. Upon discharge, $O_2$ is reduced on an air electrode (positive electrode) side to generate $OH^-$, while zinc is oxidized on a negative electrode to generate ZnO, as shown in the following reaction formulas.

Positive electrode: 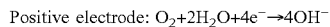
$O_2 + 2H_2O + 4e^- \rightarrow 4OH^-$

Negative electrode: 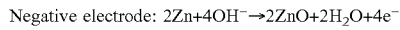
$2Zn + 4OH^- \rightarrow 2ZnO + 2H_2O + 4e^-$

By the way, it is known that in zinc secondary batteries such as a zinc-air secondary battery and nickel-zinc secondary battery, metallic zinc in a dendrite form precipitates from a negative electrode upon charge, penetrates voids of a separator such as a nonwoven fabric, and reaches a positive electrode, resulting in occurrence of a short circuit. This short circuit due to such zinc dendrites leads to shorten repeated charge/discharge life. Moreover, another problem with the zinc-air secondary battery is that carbon dioxide in the air passes through the air electrode, dissolves in the electrolyte, and precipitates an alkali carbonate to deteriorate the battery performance. Similar problems as described above can occur with lithium-air secondary batteries.

In order to deal with the problems described above, a battery comprising a layered double hydroxide (LDH) separator that blocks the penetration of zinc dendrite while selectively permeating hydroxide ions has been proposed. For example, Patent Literature 1 (WO2013/073292) discloses a zinc-air secondary battery including a LDH separator provided between an air electrode and a negative electrode in order to prevent both the short circuit between the positive and negative electrodes due to zinc dendrite and the inclusion of carbon dioxide. Patent Literature 2 (WO2016/076047) discloses a separator structure comprising an LDH separator fitted or joined to a resin outer frame, wherein the LDH separator has a high denseness such that it has a gas impermeability and/or water impermeability. Moreover, the literature also discloses that the LDH separator can be composited with a porous substrate. Further, Patent Literature 3 (WO2016/067884) discloses various methods for forming an LDH dense membrane on a surface of a porous substrate to obtain a composite material (LDH separator). This method comprises steps of uniformly adhering a raw material that can impart a starting point for LDH crystal growth to the porous substrate, treating hydrothermally the porous substrate in a raw material aqueous solution to form an LDH dense membrane on a surface of the porous substrate.

Moreover, in a field of metal-air secondary batteries such as a zinc-air secondary battery, an air electrode/separator assembly in which an air electrode layer is provided on an LDH separator has been proposed. Patent Literature 4 (WO2015/146671) discloses an air electrode/separator assembly comprising an LDH separator and an air electrode layer thereon, the air electrode layer containing an air electrode catalyst, an electron conductive material, and a hydroxide ion conductive material. Further, Patent Literature 5 (WO2018/163353) discloses a method for producing an air electrode/separator assembly by directly joining an air electrode layer containing LDH and carbon nanotubes (CNT) on an LDH separator.

CITATION LIST

Patent Literature

Patent Literature 1: WO2013/073292
Patent Literature 2: WO2016/076047
Patent Literature 3: WO2016/067884
Patent Literature 4: WO2015/146671
Patent Literature 5: WO2018/163353

SUMMARY OF THE INVENTION

As described above, the metal-air secondary battery including an LDH separator has an excellent advantage of preventing both a short circuit between the positive and negative electrodes due to the metal dendrite and an inclusion of carbon dioxide. Further, it also has an advantage of being capable of inhibiting evaporation of water contained in the electrolyte due to the denseness of the LDH separator. However, since the LDH separator blocks the permeation of the electrolyte into the air electrode, the electrolyte is absent in the air electrode layer. Therefore, the hydroxide ion conductivity tends to be low, compared with a zinc-air secondary battery including a general separator (for example, a porous polymer separator) that allows permeation of an electrolyte into an air electrode, leading to a decrease in charge/discharge performance. Therefore, there is a need for an air electrode/separator assembly that exhibits excellent charge/discharge performance while having the advantages of using an LDH separator.

The present inventors have now found that by providing, on a hydroxide ion conductive dense separator such as an LDH separator, an air electrode layer having a two-layered structure having (i) an internal catalyst layer filled with a mixture containing a hydroxide ion conductive material, an electron conductive material, an organic polymer, and an air electrode catalyst; and (ii) an outermost catalyst layer having a porosity of 60% or more and composed of a porous current collector and a LDH covering the surface thereof, a metal-air secondary battery including the resulting assembly exhibits excellent charge/discharge performance.

Therefore, an object of the present invention is to provide an air electrode/separator assembly that exhibits excellent charge/discharge performance when used in a metal-air secondary battery while including a hydroxide ion conduction dense separator such as an LDH separator.

According to an aspect of the present invention, there is provided an air electrode/separator assembly comprising a hydroxide ion conductive dense separator and an air electrode layer provided on one side of the hydroxide ion conductive dense separator, wherein the air electrode layer comprises:

an internal catalyst layer provided closer to the hydroxide ion conductive dense separator and filled with a mixture comprising a hydroxide ion conductive material, an electron conductive material, an organic polymer, and an air electrode catalyst, provided that the hydroxide ion conductive material may be the same material as the air electrode catalyst, and provided that the electron conductive material may be the same material as the air electrode catalyst, and an outermost catalyst layer provided away from the hydroxide ion conductive dense separator, composed of a porous current collector and a layered double hydroxide (LDH) covering the surface thereof, and having a porosity of 60% or more.

According to another aspect of the present invention, there is provided a metal-air secondary battery comprising the air electrode/separator assembly, a metal negative electrode, and an electrolyte, wherein the electrolyte is separated from the air electrode layer by the hydroxide ion conductive dense separator interposed therebetween.

DETAILED DESCRIPTION OF THE INVENTION

Air Electrode/Separator Assembly

Figure 1:
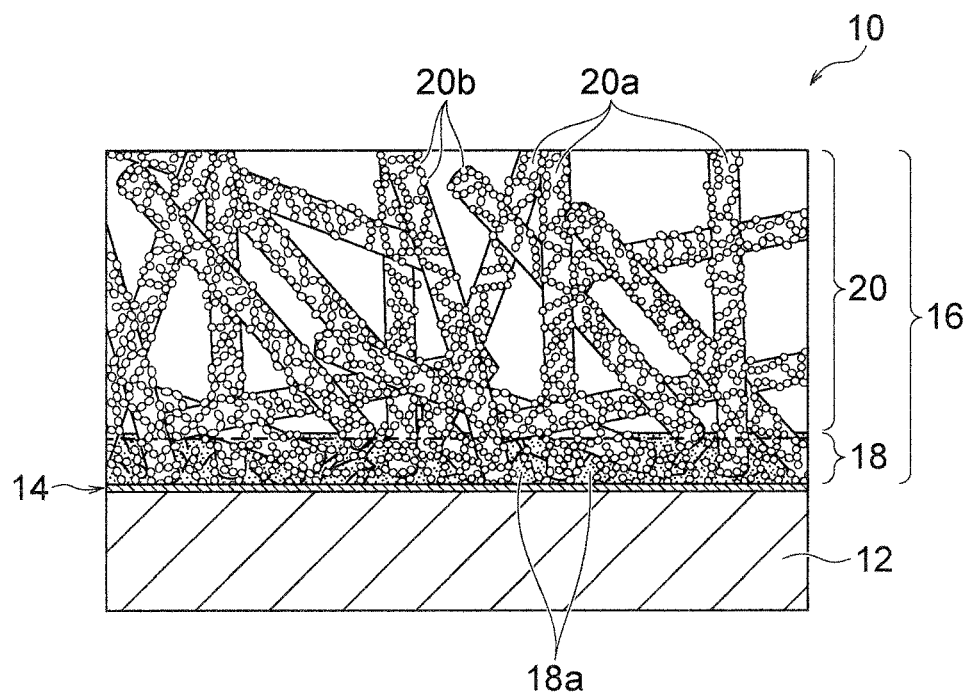
FIG. 1 is a schematic cross-sectional view conceptually illustrating an air electrode/separator assembly according to one aspect of the present invention.

FIG. 1 shows an example of an air electrode/separator assembly including a layered double hydroxide (LDH) separator as a hydroxide ion conductive dense separator. The contents hereinafter described for the LDH separator will also apply to a hydroxide ion conductive dense separator other than the LDH separator, as long as the technical consistency is not lost. Namely, the LDH separator is hereinafter interchangeable with a hydroxide ion conductive dense separator, as long as the technical consistency is not lost.

An air electrode/separator assembly 10 shown in FIG. 1 comprises a layered double hydroxide (LDH) separator 12 and an air electrode layer 16 provided on one side of LDH separator 12. Air electrode layer 16 contains an internal catalyst layer 18 provided closer to LDH separator 12 and an outermost catalyst layer 20 provided away from LDH separator 12. Internal catalyst layer 18 is filled with a mixture 18a containing a hydroxide ion conductive material, an electron conductive material, an organic polymer, and an air electrode catalyst (provided that the hydroxide ion conductive material may be the same material as the air electrode catalyst, and provided that the electron conductive material may be the same material as the air electrode catalyst). Outermost catalyst layer 20 is composed of a porous current collector 20a and an LDH 20b covering the surface thereof and has a porosity of 60% or more. As described above, by providing, on LDH separator 12, the air electrode layer having a two-layered structure having (i) internal catalyst layer 18 filled with mixture 18a containing the hydroxide ion conductive material, electron conductive material, organic polymer, and air electrode catalyst; and (ii) outermost catalyst layer 20 having a porosity of 60% or more and composed of porous current collector 20a and LDH 20b covering the surface thereof, a metal-air secondary battery including the resulting assembly can exhibit excellent charge/discharge performance.

Namely, as described above, the metal-air secondary battery including the LDH separator has an excellent advantage of being capable of preventing both the short circuit between the positive and negative electrodes due to the metal dendrite and the inclusion of carbon dioxide. Moreover, it also has an advantage of inhibiting evaporation of water contained in the electrolyte due to the denseness of the LDH separator. However, since the LDH separator blocks the permeation of the electrolyte into the air electrode, the electrolyte is absent in the air electrode layer, and therefore the hydroxide ion conductivity tends to be low, compared with a zinc-air secondary battery including a general separator (for example, a porous polymer separator) that allows permeation of an electrolyte into an air electrode, leading to a decrease in charge/discharge performance. In this respect, such a problem is conveniently solved according to air electrode/separator assembly 10.

The details of the mechanism are not necessarily clear, but it is surmised as follows. Since outermost catalyst layer 20 contains porous current collector 20a, it can function as a layer for current collection and gas diffusion as a gas diffusion electrode, and covering the surface of porous current collector 20a with LDH 20b allows the layer to have both catalytic performance and hydroxide ion conductivity in addition to the above functions, resulting in that a larger reaction region can be secured. This is because LDH 20b, i.e., the layered double hydroxide, is a hydroxide ion conductive material and can have a function as an air electrode catalyst as well. It is surmised that when such outermost catalyst layer 20 is further configured so as to be abundant in voids with a porosity of 60% or more, all of the current collection and gas diffusion functions for a gas diffusion electrode, the catalyst performance, and the hydroxide ion conductivity are extremely effectively realized without being offset by one another. In this way, the three-phase interface composed of the ion conduction phase (LDH 20b), the electron conduction phase (porous current collector 20a), and the gas phase (air) is present over the entire outermost catalyst layer 20, and therefore, the three-phase interface is present not only in the interface between LDH separator 12 and air electrode layer 16 but also in air electrode layer 16. Thus, it is surmised that hydroxide ions that contribute to the battery reaction effectively transfer in a wider surface area (i.e., the reaction resistance is lowered). Moreover, it is surmised that internal catalyst layer 18 filled with mixture 18a containing the hydroxide ion conductive material, electron conductive material, organic polymer, and air electrode catalyst allows hydroxide ions to smoothly transfer between air electrode layer 16 and LDH separator 12 (i.e., the reaction resistance is lowered.) while exhibiting the catalyst performance. It is surmised that by conveniently combining the various functions of internal catalyst layer 18 and outermost catalyst layer 20 in such a way, excellent charge/discharge performance can be realized while having the advantage of using LDH separator 12.

LDH separator 12 is a separator containing a layered double hydroxide (LDH) and/or an LDH-like compound (hereinafter collectively referred to as a hydroxide ion conductive layered compound) and is defined as a separator that selectively passes hydroxide ions by solely utilizing hydroxide ion conductivity of the hydroxide ion conductive layered compound. The "LDH-like compound" herein is a hydroxide and/or oxide having a layered crystal structure analogous to LDH but is a compound that may not be called LDH, and it can be said to be an equivalent of LDH. However, according to a broad sense of definition, it can be appreciated that "LDH" encompasses not only LDH but also LDH-like compounds. Such LDH separators can be those known as disclosed in Patent literatures 1 to 5 and are preferably LDH separators composited with porous substrates. A particularly preferable LDH separator 12 contains a porous substrate 12a made of a polymer material and a hydroxide ion conductive layered compound 12b that clogs up pores P of the porous substrate, as conceptually shown in FIG. 3, and LDH separator 12 of this type will be described later. The porous substrate containing a polymer material can be bent even when pressurized and hardly cracks, and accordingly, battery components including the substrate and other components (negative electrode, etc.) that are housed in a battery container can be pressurized in the direction such that each battery components are adhered to one another. Such pressurization is particularly advantageous when a plurality of air electrode/separator assemblies 10 are alternately incorporated into a battery container together with a plurality of metal negative electrodes to constitute a laminated battery. Similarly, it is also advantageous when a plurality of laminated batteries are housed in one module container to constitute a battery module. For example, pressurizing a zinc-air secondary battery minimizes the gap (preferably eliminates the gap) between the negative electrode and LDH separator 12 which gap allows growth of zinc dendrite, whereby effective inhibition of the zinc dendrite propagation can be expected.

However, in the present invention, various hydroxide ion conductive dense separators can be used instead of LDH separator 12. The hydroxide ion conductive dense separator is a separator containing the hydroxide ion conductive material and is defined as a separator that selectively passes hydroxide ions by solely utilizing the hydroxide ion conductivity of the hydroxide ion conductive material. Therefore, the hydroxide ion conductive dense separator has gas impermeability and/or water impermeability, particularly gas impermeability. Namely, the hydroxide ion conductive material constitutes all or a part of the hydroxide ion conductive dense separator having high denseness such that it exhibits gas impermeability and/or water impermeability. Definitions of gas impermeability and/or water impermeability will be described later with respect to LDH separator 12. The hydroxide ion conductive dense separator may be composited with a porous substrate.

Outermost catalyst layer 20 contained in air electrode layer 16 is composed of a porous current collector 20a and an LDH 20b covering the surface thereof. Porous current collector 20a is not particularly limited as long as it is composed of an electron conductive material having gas diffusivity, but porous current collector 20a is preferably composed of at least one selected from the group consisting of carbon, nickel, stainless steel, and titanium, and more preferably carbon. Specific examples of porous current collector 20a include carbon paper, nickel foam, stainless nonwoven fabric, and any combination thereof, and carbon paper is preferred. A commercially available porous material can be used as the current collector. In view of securing a wide reaction region, i.e., a wide three-phase interface composed of the ion conduction phase (LDH 20b), the electron conduction phase (porous current collector 20a), and the gas phase (air), the thickness of porous current collector 20a is preferably 0.1 to 1 mm, more preferably 0.1 to 0.5 mm, and still more preferably 0.1 to 0.3 mm. The porosity of outermost catalyst layer 20 is preferably 60% or more, more preferably 70% or more, and still more preferably 70 to 95%. Particularly in the case of carbon paper, it is more preferably 60 to 90%, still more preferably 70 to 90%, and particularly preferably 75 to 85%. The porosity values described above enable securing both excellent gas diffusibility and a wide reaction region. Moreover, the generated water is less likely to clog up pores due to the large pore spaces. The porosity can be measured by a mercury intrusion method.

LDH 20b contained in outermost catalyst layer 20 is known to have at least one of the properties of catalytic performance and hydroxide ion conductivity. Therefore, the composition of LDH 20b is not particularly limited, but preferably has a basic composition represented by the formula: $M^{2+}_{1-x}M^{3+}_x(OH)_2A^{n-}_{x/n} \cdot mH_2O$, wherein $M^{2+}$ is at least one divalent cation, and $M^{3+}$ is at least one trivalent cation, $A^{n-}$ is an n-valent anion, n is an integer of 1 or more, x is 0.1 to 0.4, and m is an arbitrary real number. In the above formula, $M^{2+}$ can be an arbitrary divalent cation, and preferred examples thereof include $Ni^{2+}$, $Mg^{2+}$, $Ca^{2+}$, $Mn^{2+}$, $Fe^{2+}$, $Co^{2+}$, $Cu^{2+}$, and $Zn^{2+}$. $M^{3+}$ can be an arbitrary trivalent cation, and preferred examples thereof include $Fe^{3+}$, $V^{3+}$, $Al^{3+}$, $Co^{3+}$, $Cr^{3+}$, and $In^{3+}$. In particular, in order for LDH 20b to have both catalytic performance and hydroxide ion conductivity, $M^{2+}$ and $M^{3+}$ each are desirably a transition metal ion. From this viewpoint, more preferred $M^{2+}$ is a divalent transition metal ion such as $Ni^{2+}$, $Mn^{2+}$, $Fe^{2+}$, $Co^{2+}$, and $Cu^{2+}$, and particularly preferably $Ni^{2+}$, and more preferred $M^{3+}$ is a trivalent transition metal ion such as $Fe^{3+}$, $V^{3+}$, $Co^{3+}$, and $Cr^{3+}$, and particularly preferably $Fe^{3+}$, $V^{3+}$, and/or $Co^{3+}$. In this case, some of $M^{2+}$ may be replaced with a metal ion other than the transition metal, such as $Mg^{2+}$, $Ca^{2+}$, and $Zn^{2+}$, and some of $M^{3+}$ may be replaced with a metal ion other than the transition metal, such as $Al^{3+}$ and $In^{3+}$. $A^{n-}$ can be an arbitrary anion. Preferred examples thereof include $NO_3^-$, $CO_3^{2-}$, $SO_4^{2-}$, $OH^-$, $Cl^-$, $I^-$, $Br^-$, and $F^-$, and it is more preferably $NO_3^-$ and/or $CO_3^{2-}$. Therefore, in the above formula it is preferred that $M^{2+}$ include $Ni^{2+}$, $M^{3+}$ include $Fe^{3+}$, and $A^{n-}$ include $NO_3^-$ and/or $CO_3^{2-}$. n is an integer of 1 or more, and preferably 1 to 3. x is 0.1 to 0.4, and preferably 0.2 to 0.35. m is an arbitrary real number and more specifically greater than or equal to 0, typically a real number or an integer greater than 0 or greater than or equal to 1.

LDH 20b has a form of a plurality of LDH platy particles, and the plurality of LDH platy particles are preferably bonded vertically or obliquely to the surface of the porous current collector. The plurality of LDH platy particles are preferably connected to one another in outermost catalyst layer 20. Such a configuration can reduce the reaction resistance. Such a configuration can be realized by immersing porous current collector 20a in the LDH raw material solution and hydrothermally synthesizing the LDH particles by a known method.

LDH 20b may be a mixture of two or more types of LDHs having different compositions. In this case, the particle diameter distributions of the two or more types of LDH particles preferably differ from one another in view of securing the strength for being supported on the substrate. It is preferred that the LDH platy particles having the larger average particle diameters be vertical or oblique to the surface of porous current collector 20a, in terms of promoting diffusion of oxygen into porous current collector 20a and securing a large amount of LHD supported.

In outermost catalyst layer 20, LDH 20b functions as the air electrode catalyst and/or the hydroxide ion conductive material, and outermost catalyst layer 20 may further contain an air electrode catalyst and/or a hydroxide ion conductive material in addition to LDH 20b. Examples of catalysts other than LDH include metal oxides, metal nanoparticles, carbon materials, and any combination thereof. A material capable of adjusting a water content is also preferably present in outermost catalyst layer 20. In this respect, LDH 20b itself functions as a material capable of adjusting a water content, and other examples include zeolite, calcium hydroxide, and combination thereof.

The method for producing outermost catalyst layer 20 is not particularly limited, and the production thereof may be carried out by hydrothermally synthesizing LDH 20b to deposit it on the surface of porous current collector 20a, by a known method. For example, (1) porous current collector 20a is provided, (2) porous current collector 20a is coated with an iron oxide solution and dried to form an iron oxide layer, (3) the porous substrate is immersed in a raw material aqueous solution containing nickel ions ($Ni^{2+}$) and urea, and (4) the porous substrate is hydrothermally treated in the raw material aqueous solution to form LDH 20b (Ni—Fe-LDH in this case) on the surface of porous current collector 20a. Thus, outermost catalyst layer 20 can be produced.

Internal catalyst layer 18 contained in air electrode layer 16 is filled with a mixture 18a containing a hydroxide ion conductive material, an electron conductive material, an organic polymer, and an air electrode catalyst. The hydroxide ion conductive material may be the same material as the air electrode catalyst, and examples of such a material include a LDH containing a transition metal (for example, Ni—Fe-LDH, Co—Fe-LDH, and Ni—Fe—V-LDH). On the other hand, examples of the hydroxide ion conductive material which does not serve as the air electrode catalyst include Mg—Al-LDH. The electron conductive material may be the same material as the air electrode catalyst, and examples of such a material include carbon materials, metal nanoparticles, nitrides such as TiN, and $LaSr_3Fe_3O_{10}$.

The hydroxide ion conductive material contained in internal catalyst layer 18 is not particularly limited as long as the material has a hydroxide ion conductivity, and it is preferably LDH and/or LDH-like compounds. The composition of LDH is not particularly limited, and preferably has a basic composition represented by the formula: $M^{2+}_{1-x}M^{3+}_x(OH)_2$ $A^{n-}_{x/n} \cdot mH_2O$, wherein $M^{2+}$ is at least one divalent cation, $M^{3+}$ is at least one trivalent cation, $A^{n-}$ is an n-valent anion, n is an integer of 1 or more, x is 0.1 to 0.4, and m is an arbitrary real number. In the above formula, $M^{2+}$ can be an arbitrary divalent cation, and preferred examples thereof include $Ni^{2+}$, $Mg^{2+}$, $Ca^{2+}$, $Mn^{2+}$, $Fe^{2+}$, $Co^{2+}$, $Cu^{2+}$, and $Zn^{2+}$. $M^{3+}$ can be an arbitrary trivalent cation, and preferred examples thereof include $Fe^{3+}$, $V^{3+}$, $Al^{3+}$, $Co^{3+}$, $Cr^{3+}$, and $In^{3+}$. In particular, in order for LDH to have both catalytic performance and hydroxide ion conductivity, $M^{2+}$ and $M^{3+}$ each are desirably a transition metal ions. From this viewpoint, more preferred $M^{2+}$ is a divalent transition metal ion such as $Ni^{2+}$, $Mn^{2+}$, $Fe^{2+}$, $Co^{2+}$, and $Cu^{2+}$, and particularly preferably $Ni^{2+}$, and more preferred $M^{3+}$ is a trivalent transition metal ion such as $Fe^{3+}$, $V^{3+}$, $Co^{3+}$, and $Cr^{3+}$, and particularly preferably $Fe^{3+}$, $V^{3+}$, and/or $Co^{3+}$. In this case, some of $M^{2+}$ may be replaced with a metal ion other than the transition metal, such as $Mg^{2+}$, $Ca^{2+}$, and $Zn^{2+}$, and some of $M^{3+}$ may be replaced with a metal ion other than the transition metal, such as $Al^{3+}$ and $In^{3+}$. $A^{n-}$ can be an arbitrary anion. Preferred examples thereof include $NO_3^-$, $CO_3^{2-}$, $SO_4^{2-}$, $OH^-$, $Cl^-$, $I^-$, $Br^-$, and $F^-$, and it is more preferably $NO_3^-$ and/or $CO_3^{2-}$. Therefore, in the above formula, it is preferred that $M^{2+}$ include $Ni^{2+}$, $M^{3+}$ include $Fe^{3+}$, and $A^{n-}$ include $NO_3^-$ and/or $CO_3^{2-}$. n is an integer of 1 or more, and preferably 1 to 3. x is 0.1 to 0.4 and preferably 0.2 to 0.35. m is an arbitrary real number and more specifically greater than or equal to 0, typically a real number or an integer greater than 0 or greater than or equal to 1.

The electron conductive material contained in internal catalyst layer 18 is preferably at least one selected from the group consisting of electron conductive ceramics and carbon materials. In particular, examples of the electron conductive ceramics include $LaNiO_3$ and $LaSr_3Fe_3O_{10}$. Examples of carbon materials include, but are not limited to, carbon black, graphite, carbon nanotubes, graphene, reduced graphene oxide, and any combination thereof, and various other carbon materials can also be used.

The air electrode catalyst contained in internal catalyst layer 18 is preferably at least one selected from the group consisting of LDH and other metal hydroxides, metal oxides, metal nanoparticles, and carbon materials, and more preferably at least one selected from the group consisting of LDH, metal oxides, metal nanoparticles, and carbon materials. LDH is as described above for the hydroxide ion conductive material, which is particularly preferable in terms of performing both the functions of the air electrode catalyst and the hydroxide ion conductive material. Examples of the metal hydroxide include Ni—Fe—OH, Ni—Co—OH and any combination thereof, which may further contain a third metal element. Examples of the metal oxide include $Co_3O_4$, $LaNiO_3$, $LaSr_3Fe_3O_{10}$, and any combination thereof. Examples of the metal nanoparticle (typically metal particle having a particle diameter of 2 to 30 nm) include Pt, Ni—Fe alloy. Examples of the carbon material include, but are not limited to, carbon black, graphite, carbon nanotubes, graphene, reduced graphene oxide, and any combination thereof, as described above, and various other carbon materials can also be used. Preferably the carbon material further contains a metal element and/or other elements such as nitrogen, boron, phosphorus, and sulfur, in view of improving the catalytic performance of the carbon material.

A known binder resin can be used as the organic polymer contained in internal catalyst layer 18. Examples of the organic polymer include a butyral-based resin, vinyl alcohol-based resin, celluloses, vinyl acetal-based resin, and fluorine-based resin, and the butyral-based resin and fluorine-based resin are preferable.

Internal catalyst layer 18 is desired to have a lower porosity than outermost catalyst layer 20 in order to efficiently transfer hydroxide ions to and from LDH separator 12. Specifically, the porosity of internal catalyst layer 18 is preferably 30 to 60%, more preferably 35 to 60%, and still more preferably 40 to 55%. For the same reason, the average pore diameter of the internal catalyst layer is preferably 5 µm or less, more preferably 0.5 to 4 µm, and still more preferably 1 to 3 µm. The measurements of the porosity and the average pore diameter of internal catalyst layer 18 can be carried out by a) polishing the cross section of the LDH separator with a cross section polisher (CP), b) using an SEM (scanning electron microscope) at a magnification of 10,000× to acquire images of two fields of vision of the cross-section of the internal catalyst layer, c) binarizing each image by using an image analysis software (for example, Image-J) based on the image data of the acquired cross-sectional image, and d) determining the area of each pore for two fields of vision, calculating the porosity values and the pore diameter values of pores, and taking the average value thereof as the porosity and the average pore diameter of the internal catalyst layer. The pore diameter can be calculated by converting the length per pixel of the image from the actual size, dividing the area of each pore obtained from the image analysis by pi, on the assumption that each pore is a perfect circle, and multiplying the square root of the quotient by 2 to obtain the average pore diameter. The porosity can be calculated by dividing the number of pixels corresponding to pores by the number of pixels in the total area and multiplying the quotient by 100.

Internal catalyst layer 18 can be fabricated by preparing a paste containing the hydroxide ion conductive material, the electron conductive material, the organic polymer, and the air electrode catalyst, and coating the surface of LDH separator 12 with the paste. Preparation of the paste can be carried out by appropriately adding the organic polymer (binder resin) and an organic solvent to a mixture of the hydroxide ion conductive material, the electron conductive material, and the air electrode catalyst, and using a known kneader such as a three-roll mill. Preferred examples of the organic solvent include alcohols such as butyl carbitol and terpineol, acetic acid ester-based solvents such as butyl acetate, and N-methyl-2-pyrrolidone. Coating LDH separator 12 with the paste can be carried out by printing. This printing can be carried out by various known printing methods, but a screen printing is preferred.

Figure 2:
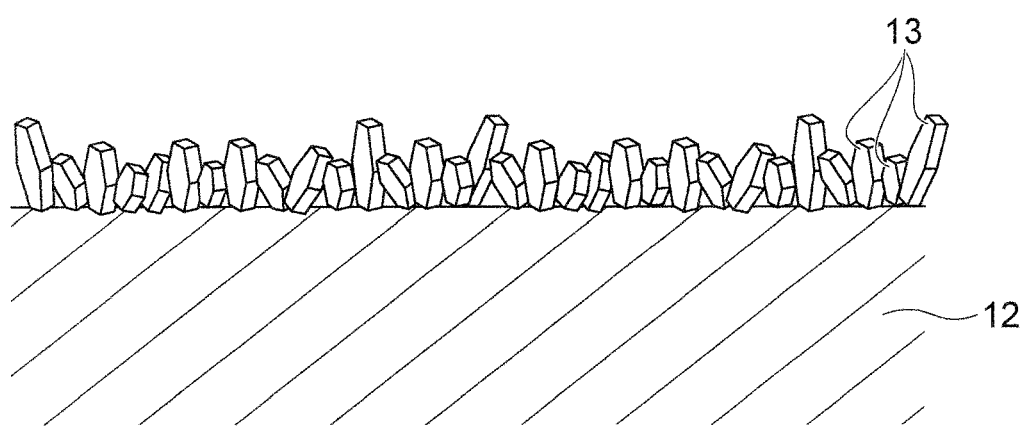
FIG. 2 is a schematic cross-sectional view conceptually illustrating an example of platy particles vertically or obliquely bonded to a surface of the LDH separator used in the present invention.

The air electrode/separator assembly 10 preferably further contains interface layer 14 containing the hydroxide ion conductive material and the electron conductive material between LDH separator 12 and air electrode layer 16. Interface layer 14 containing the hydroxide ion conductive material and the electron conductive material allows hydroxide ions to smoothly transfer between air electrode layer 16 and LDH separator 12 (i.e., the reaction resistance is lowered.), whereby the charge/discharge performance is further improved. The hydroxide ion conductive material contained in interface layer 14 is not particularly limited as long as it has hydroxide ion conductivity. LDH, LDH-like compounds, and anionic conductive polymers are exemplified, and it is preferably an LDH and/or LDH-like compound. The hydroxide ion conductive material (for example, LDH and/or LDH-like compound) contained in interface layer 14 preferably has a form of a plurality of platy particles 13, and more preferably a plurality of platy particles 13 that are vertically or obliquely bonded to the main surface of LDH separator 12 as conceptually shown in FIG. 2. In particular, the following is considered: since platy particle 13 of the hydroxide ion conductive material such as LDH and/or LDH-like compound has the property of conducting hydroxide ions in the plate surface direction (the direction of (003) plane in the case of LDH), the interfacial resistance between air electrode layer 16 and LDH separator 12 is reduced because platy particles 13 are vertically or obliquely bonded to the main surface of LDH separator 12. In particular, when observing the microstructure of the surface of LDH separator 12 fabricated according to a known method, LDH platy particles 13 are typically bonded vertically or obliquely to the main surface of LDH separator 12, as shown in FIG. 2, and in the present invention, the interfacial resistance is significantly reduced by the presence of the platy particles (hydroxide ion conductive material) in such an oriented state and the electron conductive material between LDH separator 12 and air electrode layer 16. Therefore, by adopting a material of the same type as LDH and/or LDH-like compound contained in LDH separator 12 as the hydroxide ion conductive material contained in interface layer 14, LDH platy particles 13 for constituting interface layer 14 can be provided when fabricating LDH separator 12. On the other hand, the electron conductive material contained in interface layer 14 preferably contains a carbon material. Preferred examples of the carbon material include, but are not limited to, carbon black, graphite, carbon nanotubes, graphene, reduced graphene oxide, and any combination thereof, and various other carbon materials can also be used. Interface layer 14 may be fabricated by coating the surface of LDH separator 12 on which platy particles 13 are vertically or obliquely bonded, with a slurry or solution containing a carbon material (for example, carbon ink such as graphene ink). Alternatively, when arranging internal catalyst layer 18, internal catalyst layer 18 and LDH separator 12 may be adhered to each other so that platy particles 13 on the surface of LDH separator 12 encroach into internal catalyst layer 18 to fabricate interface layer 14, and in this case, the portion where platy particles 13 encroach into internal catalyst layer 18 serves as interface layer 14.

As described above, air electrode/separator assembly 10 is preferably used for a metal-air secondary battery. Namely, a preferred aspect of the present invention provides a metal-air secondary battery comprising air electrode/separator assembly 10, a metal negative electrode, and an electrolyte, wherein the electrolyte is separated from air electrode layer 16 by LDH separator 12 interposed therebetween. A zinc-air secondary battery including a zinc electrode in a metal negative electrode is particularly preferable. Further, a lithium-air secondary battery including a lithium electrode in a metal negative electrode may be used.

LDH Separator

Figure 3:
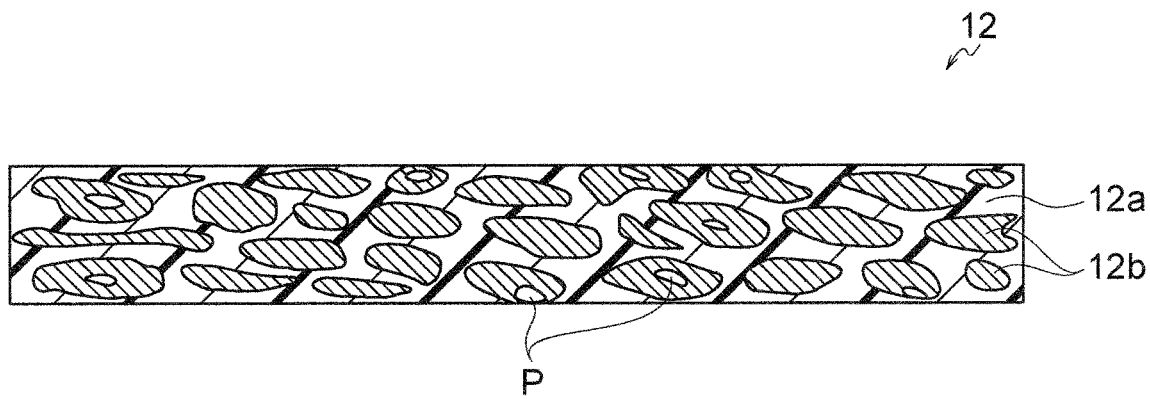
FIG. 3 is a schematic cross-sectional view conceptually illustrating a LDH separator used in the present invention.

LDH separator 12 according to a preferred embodiment of the present invention will be described below. Although the following description assumes a zinc-air secondary battery, LDH separator 12 according to the present embodiment can also be applied to other metal-air secondary batteries such as a lithium-air secondary battery. As described above, LDH separator 12 of the present embodiment contains a porous substrate 12a and a hydroxide ion conductive layered compound 12b which is the LDH and/or LDH-like compound, as conceptually shown in FIG. 3. In FIG. 3, the region of hydroxide ion conductive layered compound 12b is drawn so as not to be connected between the upper surface and the lower surface of LDH separator 12, but it is because the figure is drawn two-dimensionally as a cross section. When the depth thereof is three-dimensionally taken into account, the region of hydroxide ion conductive layered compound 12b is connected between the upper surface and the lower surface of LDH separator 12, whereby the hydroxide ion conductivity of LDH separator 12 is secured. Porous substrate 12a is made of a polymer material, and the pores of porous substrate 12a are clogged up with hydroxide ion conductive layered compound 12b. However, the pores of porous substrate 12a may not be completely clogged up, and residual pores P can be slightly present. By clogging up the pores of polymer porous substrate 12a with hydroxide ion conductive layered compound 12b to make the substrate highly densified in this way, LDH separator 12 capable of even more effectively inhibiting short circuits due to zinc dendrites can be provided.

Moreover, LDH separator 12 of the present embodiment has excellent flexibility and strength in addition to desirable ion conductivity required of a separator due to the hydroxide ion conductivity of hydroxide ion conductive layered compound 12b. This is due to the flexibility and strength of polymer porous substrate 12a itself contained in LDH separator 12. Namely, since LDH separator 12 is densified so that the pores of polymer porous substrate 12a are sufficiently clogged up with hydroxide ion conductive layered compound 12b, polymer porous substrate 12a and hydroxide ion conductive layered compound 12b are integrated in complete harmony as a highly composited material, and therefore the rigidity and brittleness due to hydroxide ion conductive layered compound 12b, which is a ceramic material, can be said to be offset or reduced by the flexibility and strength of polymer porous substrate 12a.

LDH separator 12 of the present embodiment desirably has extremely few residual pores P (the pores not clogged up with hydroxide ion conductive layered compound 12b). Due to residual pores P, LDH separator 12 has, for example, an average porosity of 0.03% or more and less than 1.0%, preferably 0.05% or more and 0.95% or less, more preferably 0.05% or more and 0.9% or less, still more preferably 0.05 to 0.8%, and most preferably 0.05 to 0.5%. With an average porosity within the above range, the pores of porous substrate 12a are sufficiently clogged up with hydroxide ion conductive layered compound 12b to provide an extremely high denseness, which therefore can inhibit short circuits due to zinc dendrites even more effectively. Further, significantly high ionic conductivity can be realized, and LDH separator 12 can exhibit a sufficient function as a hydroxide ion conductive dense separator. The measurement of the average porosity can be carried out by a) polishing the cross section of the LDH separator with a cross section polisher (CP), and b) using an FE-SEM (field-emission scanning electron microscope) at a magnification of 50,000× to acquire images of two fields of vision of the cross-sectional of the functional layer, and c) calculating the porosity of each of the two fields of vision by using an image inspection software (for example, HDevelop, manufactured by MVTec Software GmbH) based on the image data of the acquired cross-sectional image and d) determining the average value of the obtained porosities.

LDH separator 12 is a separator containing hydroxide ion conductive layered compound 12b, and separates a positive electrode plate and a negative electrode plate such that hydroxide ions can be conducted when the separator is incorporated in a zinc secondary battery. Namely LDH separator 12 exhibits a function as a hydroxide ion conductive dense separator. Therefore, LDH separator 12 has gas impermeability and/or water impermeability. Thus, LDH separator 12 is preferably densified so as to have gas impermeability and/or water impermeability. As described in Patent Literatures 2 and 3, "having gas impermeability" herein means that even when helium gas is brought into contact with one side of the object to be measured in water at a differential pressure of 0.5 atm, no bubbles are generated due to the helium gas from another side. Further, as used herein, "having water impermeability" means that water in contact with one side of the object to be measured does not permeate to the other side as described in Patent Literatures 2 and 3. Namely, LDH separator 12 having gas impermeability and/or water impermeability means LDH separator 12 having a high degree of denseness such that it does not allow gas or water to pass through, and means that LDH separator 12 is not a porous film or other porous material that has water permeability or gas permeability. In this way, LDH separator 12 selectively allows hydroxide ions alone to pass through due to its hydroxide ion conductivity and can exhibit a function as a battery separator. Therefore, the configuration is extremely effective in physically blocking penetration of the separator by the zinc dendrite generated upon charge to prevent a short circuit between the positive and negative electrodes. Since LDH separator 12 has hydroxide ion conductivity, it is possible to efficiently move the required hydroxide ions between the positive electrode plate and the negative electrode plate, and to realize the charge/discharge reaction in the positive electrode plate and the negative electrode plate.

LDH separator 12 preferably has a He permeability of 3.0 cm/min-atm or less per unit area, more preferably 2.0 cm/min-atm or less, and still more preferably 1.0 cm/min-atm or less. A separator having a He permeability of 3.0 cm/min-atm or less can extremely effectively inhibit Zn permeation (typically permeation of zinc ion or zinc acid ion) in an electrolyte. It is considered in principle that due to such significant inhibition of Zn penetration, the separator of the present embodiment can inhibit effectively the growth of zinc dendrite when used in a zinc secondary battery. The He permeability is measured by supplying He gas to one surface of the separator to allow the He gas to pass through the separator, and calculating the He permeability to evaluate the denseness of the hydroxide ion conductive dense separator. The He permeability is calculated by the formula of F/(P×S) by using the permeation amount F of the He gas per unit time, the differential pressure P applied to the separator when the He gas permeates, and the membrane area S through which the He gas permeates. By evaluating the gas permeability using the He gas in this way, it is possible to evaluate the presence or absence of denseness at an extremely high level, and as a result, it is possible to effectively evaluate a high degree of denseness such that substances other than hydroxide ions (in particular Zn bringing about zinc dendrite growth) can be permeated as little as possible (only a very small amount is permeated). This is because an He gas has the smallest constituent unit among a wide variety of atoms or molecules that can form a gas and also has extremely low reactivity. Namely, He constitutes a He gas by a single He atom without forming a molecule. In this respect, hydrogen gas is composed of $H_2$ molecules, and the He atom alone is smaller as a gas constituent unit. In the first place, $H_2$ gas is dangerous because it is a flammable gas. Then, by adopting the index of He gas permeability defined by the above formula, it is possible to easily evaluate the denseness objectively regardless of the difference in various sample sizes and measurement conditions. In this way, it is possible to easily, safely and effectively evaluate whether or not the separator has sufficiently high denseness suitable for a zinc secondary battery separator. The measurement of He permeability can be preferably carried out according to the procedure in Evaluation 4 of the Example described later.

In LDH separator 12, hydroxide ion conductive layered compound 12b, which is an LDH and/or LDH-like compound, clogs up the pores of porous substrate 12a. As is generally known, LDH is composed of a plurality of hydroxide basic layers and an intermediate layer interposed between the plurality of hydroxide basic layers. The basic hydroxide layer is mainly composed of metal elements (typically metal ions) and OH groups. The intermediate layer of LDH is composed of anions and $H_2O$. The anion is a mono- or higher-valent anion and preferably a monovalent or divalent ion. The anion in LDH preferably contains $OH^-$ and/or $CO_3^{2-}$. LDH also has excellent ion conductivity due to its unique properties.

In general, LDH has been known as a compound represented by the basic composition formula: $M^{2+}_{1-x}M^{3+}_x(OH)_2 A^{n-}_{x/n} \cdot mH_2O$ wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. In the above basic composition formula, $M^{2+}$ can be arbitrary divalent cation, but preferred examples thereof include $Mg^{2+}$, $Ca^{2+}$ and $Zn^{2+}$, and it is more preferably $Mg^{2+}$. $M^{3+}$ can be arbitrary trivalent cation, a preferred example thereof includes $Al^{3+}$ or $Cr^{3+}$, and it is more preferably $Al^{3+}$. $A^{n-}$ can be arbitrary anion, and preferred examples thereof include $OH^-$ and $CO_3^{2-}$. Therefore, in the above basic composition formula, it is preferred that $M^{2+}$ include $Mg^{2+}$, $M^{3+}$ include $Al^{3+}$, and $A^{n-}$ include $OH^-$ and/or $CO_3^{2-}$. n is an integer of 1 or more, and is preferably 1 or 2. x is 0.1 to 0.4 and preferably 0.2 to 0.35. m is an arbitrary numeral meaning the number of moles of water, is greater than or equal to 0, typically a real number greater than 0 or greater than or equal to 1. However, the above basic composition formula is merely a representatively exemplified formula of the "basic composition" of LDH, generally, and the constituent ions can be appropriately replaced. For example, in the above basic composition formula, some or all of $M^{3+}$ may be replaced with a tetra- or higher-valent cation, and in that case, the coefficient x/n of anion $A^{n-}$ in the above formula may be appropriately changed.

For example, the hydroxide basic layer of LDH may contain Ni, Al, Ti and OH groups. The intermediate layer is composed of anions and $H_2O$ as described above. The alternating laminated structure of the hydroxide basic layer and the intermediate layer, itself is basically the same as the generally known LDH alternating laminated structure, but the LDH of the present embodiment in which the hydroxide basic layer of LDH is composed of predetermined elements or ions including Ni, Al, Ti and OH groups can exhibit excellent alkali resistance. The reason for this is not necessarily clear, but it is considered that Al, which has been conventionally thought to be easy to elute in an alkaline solution, is less likely to elute in an alkaline solution due to some interaction with Ni and Ti in the LDH of the present embodiment. Nevertheless, LDH of the present embodiment can also exhibit high ion conductivity suitable for use as a separator for an alkaline secondary battery. Ni in LDH can be in the form of nickel ions. Nickel ions in LDH are typically considered to be $Ni^{2+}$ but are not particularly limited thereto as other valences such as $Ni^{3+}$ are possible. Al in LDH can be in the form of aluminum ions. Aluminum ions in LDH are typically considered to be $Al^{3+}$ but are not particularly limited thereto as other valences are possible. Ti in LDH can be in the form of titanium ions. Titanium ions in LDH are typically considered to be $Ti^{4+}$ but are not particularly limited thereto as other valences such as $Ti^{3+}$ are possible. The hydroxide basic layer may contain other elements or ions as long as it contains at least Ni, Al, Ti and OH groups. However, the hydroxide basic layer preferably contains Ni, Al, Ti and OH groups as main components. Namely, the hydroxide basic layer is preferably mainly composed of Ni, Al, Ti and OH groups. Therefore, the hydroxide basic layer is typically composed of Ni, Al, Ti, OH groups and, in some cases, unavoidable impurities. The unavoidable impurity is an arbitrary element that can be unavoidably mixed due to the production process, and can be mixed in LDH, for example, derived from a raw material or a substrate. As described above, the valences of Ni, Al and Ti are not always fixed, and it is impractical or impossible to specify LDH strictly by a general formula. Assuming that the hydroxide basic layer is mainly composed of $Ni^{2+}$, $Al^{3+}$, $Ti^{4+}$ and OH groups, the corresponding LDH has the basic composition that can be represented by the formula: $Ni^{2+}_{1-x-y}Al^{3+}_x Ti^{4+}_y(OH)_2 A^{n-}_{(x+2y)/n} \cdot mH_2O$ is an n-valent anion, n is an integer of 1 or more and preferably 1 or 2, $0<x<1$ and preferably $0.01 \leq x \leq 0.5$, $0<y<1$ and preferably $0.01 \leq y \leq 0.5$, $0<x+y<1$, m is 0 or more and typically a real number greater than 0 or greater than or equal to 1. However, the above formula is understood as "basic composition", and it is understood that elements such as $Ni^{2+}$, $Al^{3+}$, and $Ti^{4+}$ are replaceable with other elements or ions (including the same elements or ions having other valences, or elements or ions unavoidably mixed due to the production process) to an extent such that the basic characteristics of LDH are not impaired.

The LDH-like compound is a hydroxide and/or oxide having a layered crystal structure analogous to LDH but is a compound that may not be called LDH, and the LDH-like compound preferably contains Mg, and one or more elements selected from the group consisting of, Ti, Y and Al and containing at least Ti. As described above, by using an LDH-like compound that is a hydroxide and/or an oxide having a layered crystal structure containing at least Mg and Ti, instead of the conventional LDH, as the hydroxide ion conductive substance, a hydroxide ion conductive separator can be provided that is excellent in the alkali resistance and capable of inhibiting a short circuit due to zinc dendrite even more effectively. Therefore, a preferred LDH-like compound is a hydroxide and/or oxide having a layered crystal structure containing Mg, and one or more elements selected from the group consisting of Ti, Y and Al and containing at least Ti. Therefore, a typical LDH-like compound is a composite hydroxide and/or composite oxide of Mg, Ti, optionally Y and optionally Al, and particularly preferably a composite hydroxide and/or composite oxide of Mg, Ti, Y and Al. The above elements may be replaced with other elements or ions to an extent such that the basic properties of the LDH-like compound are not impaired, but the LDH-like compound preferably contains no Ni.

LDH-like compounds can be identified by X-ray diffraction. Specifically, when X-ray diffraction is carried out on the surface of the LDH separator, a peak assigned to the LDH-like compound is detected typically in the range of $5°≤2θ≤10°$, and more typically in the range of $7°≤2θ≤10°$. As described above, the LDH is a substance having an alternating laminated structure in which exchangeable anions and $H_2O$ are present as an intermediate layer between the stacked hydroxide basic layers. In this regard, when LDH is analyzed by the X-ray diffraction method, a peak assigned to the crystal structure of LDH (i.e., the peak assigned to (003) of LDH) is originally detected at a position of $2θ=11$ to $12°$. When the LDH-like compound is analyzed by the X-ray diffraction method, on the other hand, a peak is typically detected in the aforementioned range shifted to the lower angle side than the above peak position of LDH. Further, the interlayer distance of the layered crystal structure can be determined by Bragg's equation using $2θ$ corresponding to the peak assigned to the LDH-like compound in X-ray diffraction. The interlayer distance of the layered crystal structure of the LDH-like compound thus determined is typically 0.883 to 1.8 nm, and more typically 0.883 to 1.3 nm.

The atomic ratio of $Mg/(Mg+Ti+Y+Al)$ in the LDH-like compound, as determined by energy dispersive X-ray analysis (EDS), is preferably 0.03 to 0.25 and more preferably 0.05 to 0.2. Moreover, the atomic ratio of $Ti/(Mg+Ti+Y+Al)$ in the LDH-like compound is preferably 0.40 to 0.97 and more preferably 0.47 to 0.94. Further, the atomic ratio of $Y/(Mg+Ti+Y+Al)$ in the LDH-like compound is preferably 0 to 0.45 and more preferably 0 to 0.37. Further, the atomic ratio of $Al/(Mg+Ti+Y+Al)$ in the LDH-like compound is preferably 0 to 0.05 and more preferably 0 to 0.03. Within the above ranges, the alkali resistance is more excellent, and the effect of inhibiting a short circuit due to zinc dendrite (i.e., dendrite resistance) can be more effectively realized. By the way, LDH conventionally known for LDH separators has the basic composition that can be represented by the formula: $M^{2+}_{1-x}M^{3+}_x(OH)_2A^{n-}_{x/n}\cdot mH_2O$, wherein $M^{2+}$ is a divalent cation, $M^{3+}$ is a trivalent cation, $A^{1-}$ is an n-valent anion, n is an integer of 1 or more, x is 0.1 to 0.4, and m is 0 or more. The atomic ratios in the LDH-like compound generally deviate from those in the above formula for LDH. Therefore, the LDH-like compound generally can be said to have a composition ratio (atomic ratio) different from that of the conventional LDH. EDS analysis is preferably carried out with an EDS analyzer (for example, X-act, manufactured by Oxford Instruments Plc.), by 1) capturing an image at an acceleration voltage of 20 kV and a magnification of 5,000×, 2) carrying out three-point analysis at intervals of about 5 μm in the point analysis mode, 3) repeating the above 1) and 2) once more, and 4) calculating the average value of a total of 6 points.

As described above, LDH separator 12 contains hydroxide ion conductive layered compound 12b and porous substrate 12a (typically LDH separator 12 consists of porous substrate 12a and hydroxide ion conductive layered compound 12b), and the hydroxide ion conductive layered compound clogs up pores of the porous substrate so that LDH separator 12 exhibits hydroxide ion conductivity and gas impermeability (hence to function as an LDH separator exhibiting hydroxide ion conductivity). Hydroxide ion conductive layered compound 12b is particularly preferably incorporated over the entire area of polymer porous substrate 12a in the thickness direction. The thickness of the LDH separator is preferably 3 to 80 μm, more preferably 3 to 60 μm, and still more preferably 3 to 40 μm.

Porous substrate 12a is made of a polymer material. Polymer porous substrate 12a has advantages of 1) having flexibility (hence, polymer porous substrate 12a hardly cracks even when it is thin.), 2) facilitating increase in porosity, and 3) facilitating increase in conductivity (it can be thin while having increased porosity.), and 4) facilitating manufacture and handling. Further, taking advantage derived from the flexibility of 1) above, it also has an advantage of 5) ease in bending or sealing/bonding the LDH separator containing a porous substrate made of a polymer material. Preferred examples of the polymer material include polystyrene, polyether sulfone, polypropylene, an epoxy resin, polyphenylene sulfide, a fluororesin (tetrafluororesin: PTFE, etc.), cellulose, nylon, polyethylene and any combination thereof. In view of a thermoplastic resin suitable for heat pressing, more preferred examples include polystyrene, polyether sulfone, polypropylene, an epoxy resin, polyphenylene sulfide, a fluororesin (tetrafluororesin: PTFE, etc.), nylon, polyethylene and any combination thereof. All of the various preferred materials described above have the alkali resistance, which serves as a resistance to the electrolyte of the battery. Particularly preferable polymer materials are polyolefins such as polypropylene and polyethylene and most preferably polypropylene or polyethylene in terms of excellent hot water resistance, acid resistance and alkali resistance as well low cost. When the porous substrate is made of a polymer material, the hydroxide ion conductive layered compound is particularly preferably incorporated over the entire porous substrate in the thickness direction (for example, most or almost all of the pores inside the porous substrate are filled with the hydroxide ion conductive layered compound). As such a polymer porous substrate, a commercially available polymer microporous membrane can be preferably used.

The LDH separator of the present embodiment can be produced by (i) fabricating the hydroxide ion conductive layered compound-containing composite material according to a known method (see, for example, Patent Literatures 1 to 3) by using a polymer porous substrate, and (ii) pressing this hydroxide ion conductive layered compound-containing composite material. The pressing method may be, for example, a roll press, a uniaxial pressure press, a CIP (cold isotropic pressure press), etc., and is not particularly limited. The pressing method is preferably by a roll press. This pressing is preferably carried out while heating in terms of softening the porous substrate to enable to clog up sufficiently the pores of the porous substrate with the hydroxide ion conductive layered compound. For example, for polypropylene or polyethylene, the temperature for sufficient softening is preferably heated at 60 to 200° C. Pressing by, for example, a roll press in such a temperature range can significantly reduce the average porosity derived from the residual pores of the LDH separator; as a result, the LDH separator can be extremely highly densified, and hence short circuits due to zinc dendrites can be inhibited even more effectively. When carrying out the roll pressing, the form of the residual pores can be controlled by appropriately adjusting the roll gap and the roll temperature, whereby an LDH separator having a desired denseness or average porosity can be obtained.

The method for producing the hydroxide ion conductive layered compound-containing composite material (i.e., the crude LDH separator) before pressing is not particularly limited, and it can be fabricated by appropriately changing the conditions in a known method for producing an LDH-containing functional layer and a composite material (i.e., LDH separator) (see, for example, Patent Literatures 1 to 3). For example, the hydroxide ion conductive layered compound-containing functional layer and the composite material (i.e., an LDH separator) can be produced by (1) providing a porous substrate, (2) coating the porous substrate with a titanium oxide sol or a mixed sol of alumina and titania followed by heat treatment to form a titanium oxide layer or alumina/titania layer, (3) immersing the porous substrate in a raw material aqueous solution containing nickel ions ($Ni^{2+}$) and urea, and (4) treating hydrothermally the porous substrate in the raw material aqueous solution to form a hydroxide ion conductive layered compound-containing functional layer on the porous substrate and/or in the porous substrate. In particular, forming of the titanium oxide layer or the alumina/titania layer on the porous substrate in the above step (2) provides not only the raw material of the hydroxide ion conductive layered compound, but also the function as a starting point of the crystal growth of the hydroxide ion conductive layered compound to enable to form uniformly a highly densified hydroxide ion conductive layered compound-containing functional layer in the porous substrate. Further, the urea present in the above step (3) generates ammonia in the solution by utilizing the hydrolysis of the urea to raise the pH value, which allows the coexisting metal ions to form a hydroxide to obtain a hydroxide ion conductive layered compound. In addition, since the hydrolysis involves the generation of carbon dioxide, a hydroxide ion conductive layered compound having an anion of carbonate ion type can be obtained.

In particular, when fabricating a composite material including a porous substrate made of a polymer material in which the functional layer is incorporated over the entire porous substrate in the thickness direction (i.e., an LDH separator), the substrate is preferably coated with the mixed sol of alumina and titania in the above (2) so as to permeate the whole or most of the inside of the substrate with the mixed sol. In this way, most or almost all the pores inside the porous substrate can be finally filled with the hydroxide ion conductive layered compound. Examples of a preferable coating method include a dip coating and a filtration coating, and a dip coating is particularly preferable. By adjusting the number of times of coating by the dip coating, etc., the amount of the mixed sol adhered can be adjusted. The substrate coated with the mixed sol by dip coating, etc. may be dried and then the above steps (3) and (4) may be carried out.

EXAMPLES

The present invention will be described in more detail by the following examples.

Example A1

LDH separators were fabricated by the following procedure and evaluated.
(1) Provision of Polymer Porous Substrate A commercially available polyethylene microporous membrane having a porosity of 50%, an average pore diameter of 0.1 μm and a thickness of 20 μm was provided as a polymer porous substrate, and cut out to a size of 2.0 cm×2.0 cm.
(2) Alumina·Titania Sol Coating on Polymer Porous Substrate Amorphous alumina solution (Al-ML15, manufactured by Taki Chemical Co., Ltd.) and titanium oxide sol solution (M6, manufactured by Taki Chemical Co., Ltd.) were mixed in Ti/Al (molar ratio)=2 to fabricate a mixed sol. The substrate provided in (1) above was coated with the mixed sol by dip coating. The dip coating was carried out by immersing the substrate in 100 ml of the mixed sol, pulling it up vertically, and drying it in a dryer at 90° C. for 5 minutes.
(3) Preparation of Raw Material Aqueous Solution Nickel nitrate hexahydrate ($Ni(NO_3)_2 \cdot 6H_2O$, manufactured by Kanto Chemical Co., Inc., and urea (($NH_2)_2CO$, manufactured by Sigma Aldrich Co. LLC)) were provided as raw materials. Nickel nitrate hexahydrate was weighed so as to give 0.015 mol/L and placed in a beaker, and ion-exchanged water was added thereto to make a total volume 75 ml. After stirring the obtained solution, urea weighed to satisfy the ratio of urea/$NO_3^-$(molar ratio)=16 was added in the solution, and the mixture was further stirred to obtain a raw material aqueous solution.
(4) Film Formation by Hydrothermal Treatment The raw material aqueous solution and the dip-coated substrate were placed together in a Teflon® airtight container (autoclave container with outer stainless-steel jacket, content of 100 ml), and the container was closed tightly. At this time, the substrate was fixed while being floated from the bottom of the Teflon® airtight container and placed horizontally so that the solution was in contact with both sides of the substrate. Then, LDH was formed on the surface and the inside of the substrate by subjecting it to hydrothermal treatment at a hydrothermal temperature of 120° C. for 24 hours. With an elapse of a predetermined time, the substrate was taken out from the airtight container, washed with ion-exchanged water, and dried at 70° C. for 10 hours to form LDH in the pores of the porous substrate. In this way, a composite material containing LDH was obtained.
(5) Densification by Roll Pressing The composite material containing LDH described above was sandwiched between a pair of PET films (Lumirror®, thickness of 40 μm, manufactured by Toray Industries, Inc.) and the roll pressing was carried out at a roll rotation speed of 3 mm/s, a roll temperature of 120° C., and a roll gap of 60 μm to obtain an LDH separator.
(6) Evaluation Result The following evaluation was carried out for the obtained LDH separator.

Evaluation 1: Identification of LDH Separator

An XRD profile was obtained by measuring the crystal phase of the LDH separator with an X-ray diffractometer (RINT TTR III manufactured by Rigaku Corporation) under the measurement conditions of voltage: 50 kV, current value: 300 mA, and measurement range: 10 to 70°. For the obtained XRD profile, identification was carried out by using the diffraction peak of LDH (hydrotalcites compound) described in JCPDS card No. 35-0964. The LDH separator of the present example was identified as LDH (hydrotalcites compound).

Evaluation 2: Measurement of Thickness

The thickness of the LDH separator was measured using a micrometer. The thicknesses were measured at three points, and the average value thereof was taken as the thickness of the LDH separator. As a result, the thickness of the LDH separator of the present example was 13 μm.

Evaluation 3: Measurement of Average Porosity

The LDH separator was cross-sectionally polished with a cross-section polisher (CP), and two fields of vision of the LDH separator cross-sectional image were acquired with a FE-SEM (ULTRA55, manufactured by Carl Zeiss) at a magnification of 50,000×. Based on this image data, porosity of each of the two fields of vision was calculated by using an image inspection software (HDevelop, manufactured by MVTec Software GmbH) and the average value thereof was taken as the average porosity of the LDH separator. As a result, the average porosity of the LDH separator of the present example was 0.8%.

Evaluation 4: Measurement of He Permeation

Figure 4A:
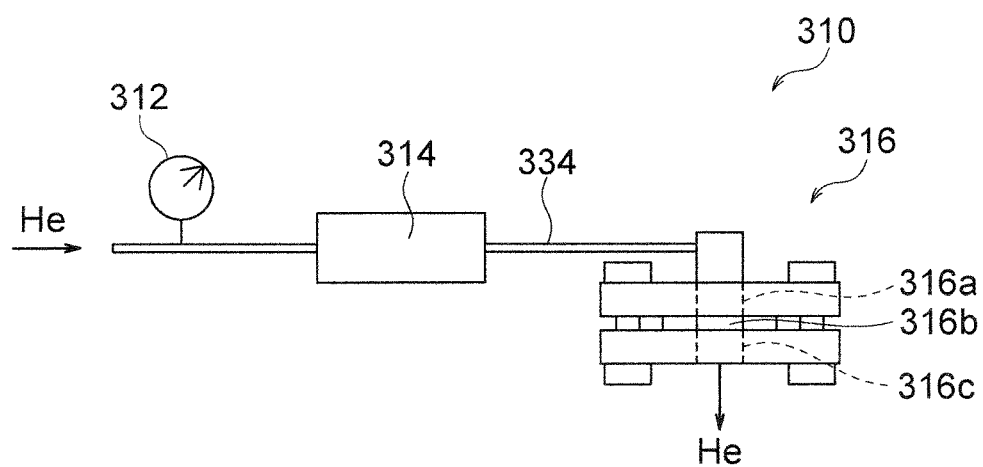
FIG. 4A is a conceptual view of an example of the He permeability measurement system used in Example A1.
Figure 4B:
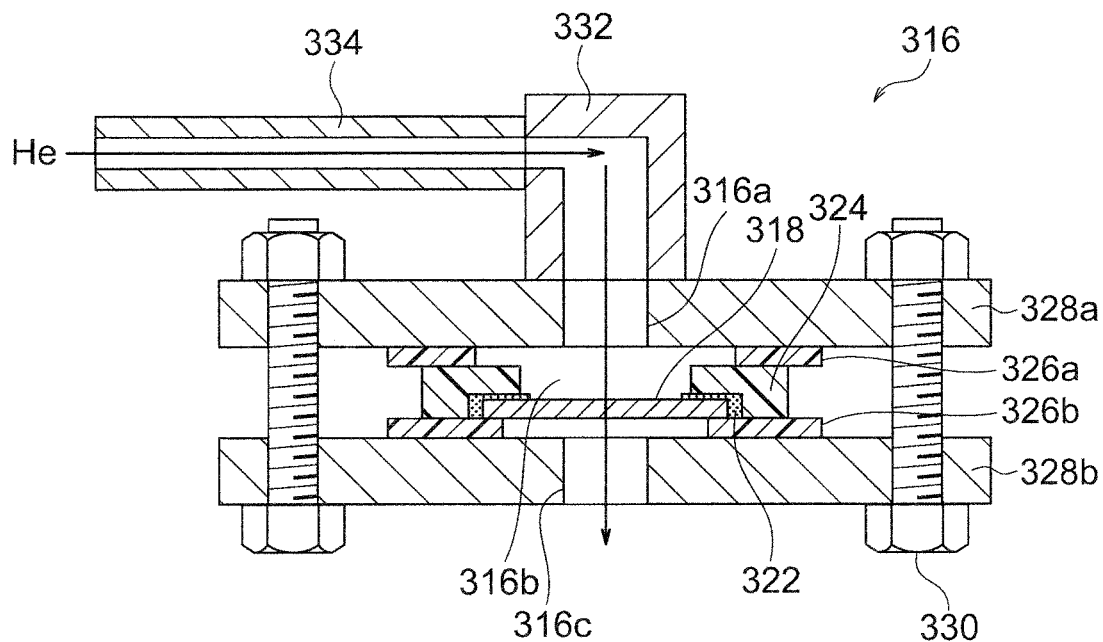
FIG. 4B is a schematic cross-sectional view of a sample holder used in the measurement system shown in FIG. 4A and peripheral configuration thereof.

The He permeation test was carried out as follows in order to evaluate the denseness of the LDH separator in terms of He permeability. First, a He permeability measurement system 310 shown in FIGS. 4A and 4B was constructed. He permeability measurement system 310 was configured so that He gas from a gas cylinder filled with He gas was supplied to a sample holder 316 via a pressure gauge 312 and a flow meter 314 (digital flow meter) and was allowed to pass from one surface of LDH separator 318 held in sample holder 316 to the other surface to be discharged.

Sample holder 316 has a structure comprising a gas supply port 316a, a closed space 316b, and a gas discharge port 316c, and was assembled as follows. First, the outer circumference of LDH separator 318 was coated with an adhesive 322 and was attached to a jig 324 (made of ABS resin) having an opening in the center. Packings made of butyl rubber were arranged as sealing members 326a and 326b at the upper and lower ends of this jig 324 and were further sandwiched with support members 328a and 328b (made of PTFE) with openings, which were flanges, from the outside of sealing members 326a and 326b. In this way, closed space 316b was defined by LDH separator 318, jig 324, sealing member 326a, and support member 328a. Support members 328a and 328b were fastened tightly to each other by a fastening means 330 using screws so that He gas did not leak from a portion other than a gas discharge port 316c. A gas supply pipe 334 was connected to gas supply port 316a of sample holder 316 thus assembled via a joint 332.

Next, He gas was supplied to He permeability measurement system 310 through gas supply pipe 334 and was allowed to pass through LDH separator 318 held in sample holder 316. At this time, the gas supply pressure and the flow rate were monitored by pressure gauge 312 and flow meter 314. After the passage of the He gas for 1 to 30 minutes, the He permeability was calculated. The He permeability was calculated by using the formula: F/(P×S), wherein F ($cm^3$/min) is the amount of the He gas passing per unit time, P (atm) is the differential pressure applied to the LDH separator when the He gas passes, and S ($cm^2$) is the membrane area through which the He gas passes. The amount F ($cm^3$/min) of He gas passing was read directly from flow meter 314. Further, differential pressure P was determined by using the gauge pressure read from pressure gauge 312. The He gas was supplied so that differential pressure P was in the range of 0.05 to 0.90 atm. As a result, the He permeability per unit area of the LDH separator was 0.0 cm/min·atm.

Evaluation 5: Observation of Microstructure of Separator Surface

Figure 5:
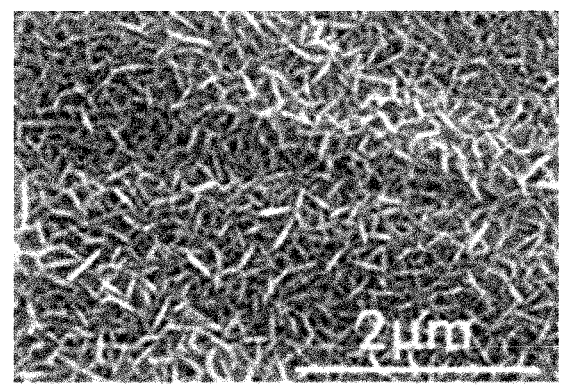
FIG. 5 is an SEM image when observing a surface of the LDH separator fabricated in Example A1.

When observing the surface of the LDH separator by SEM, it was observed that innumerable LDH platy particles were bonded vertically or obliquely to the main surface of the LDH separator, as shown in FIG. 5.

Example B1 (Reference)

Figure 6A:
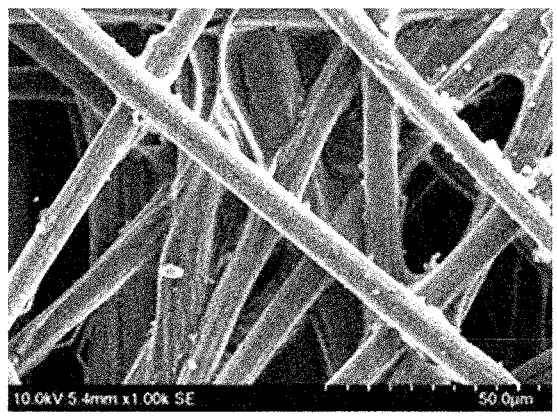
FIG. 6A is an SEM image when observing a surface of carbon fibers constituting carbon paper in the outermost catalyst layer fabricated in Example B1.
Figure 6B:
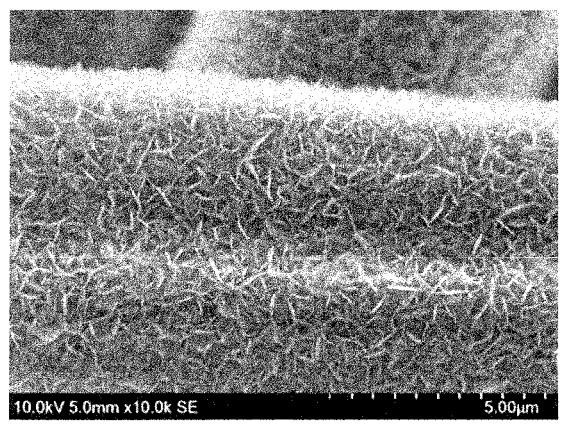
FIG. 6B is an enlarged SEM image when observing a surface of the carbon fiber shown in FIG. 6A.
Figure 6C:
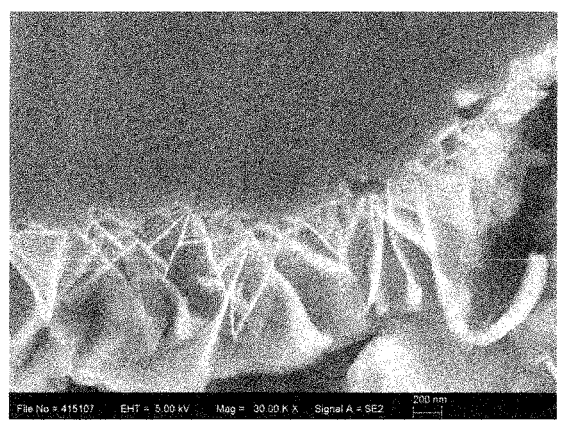
FIG. 6C is an SEM image when observing a cross section in a vicinity of a surface of the carbon fiber shown in FIG. 6A.

An air electrode/separator assembly having two layers of an interface layer and an outermost catalyst layer on the LDH separator fabricated in Example A1 was fabricated by the following procedure and was evaluated.
(1) Fabrication of Outermost Catalyst Layer
(1a) Iron Oxide Sol Coating on Conductive Porous Substrate
10 ml of iron oxide sol (Fe—C10, iron oxide concentration of 10% by weight, manufactured by Taki Chemical Co., Ltd.) diluted with ion-exchanged water and adjusted to a concentration of 5% by weight was placed in a beaker, and carbon paper (TGP-H-060, thickness of 200 μm, manufactured by Toray Industries, Inc.) was immersed therein. The beaker was evacuated to allow the iron oxide sol to fully penetrate into the carbon paper. The carbon paper was pulled up from the beaker by using tweezers and dried at 80° C. for 30 minutes to obtain a carbon paper to which iron oxide particles were adhered as a substrate.
(1b) Preparation of Raw Material Aqueous Solution Nickel nitrate hexahydrate ($Ni(NO_3)_2 \cdot 6H_2O$, manufactured by Kanto Chemical Co., Inc., and urea (($NH_2)_2CO$, manufactured by Mitsui Chemicals Inc.)) were provided as raw materials. Nickel nitrate hexahydrate was weighed so as to give a concentration of 0.03 mol/L and placed in a beaker, and ion-exchanged water was added thereto to make the total volume 75 ml. After stirring the obtained solution, urea was added to the solution to 0.96 mol/l, and the mixture was further stirred to obtain a raw material aqueous solution.
(1c) Membrane Formation by Hydrothermal Treatment The raw material aqueous solution fabricated in (1b) above and the substrate fabricated in (1a) above were placed together in a Teflon® airtight container (autoclave container with outer stainless-steel jacket, content of 100 ml), and the container was closed tightly. At this time, the substrate was fixed while being floated from the bottom of the Teflon® airtight container and placed horizontally so that the solution was in contact with both sides of the substrate. Then, LDH was formed on the fiber surface inside the substrate by subjecting it to hydrothermal treatment at a hydrothermal temperature of 120° C. for 20 hours. With an elapse of a predetermined time, the substrate was taken out from the airtight container, washed with ion-exchanged water, and dried at 80° C. for 30 minutes to obtain an outermost catalyst layer as the air electrode layer. When the fine structure of the obtained outermost catalyst layer was observed by SEM, the images shown in FIGS. 6A to 6C were obtained. FIG. 6B is an enlarged image of the surface of the carbon fibers constituting the carbon paper shown in FIG. 6A, and FIG. 6C is an enlarged cross-sectional image of the vicinity of the surface of the carbon fibers shown in FIG. 6A. From these figures, it was observed that innumerable LDH platy particles were vertically or obliquely bonded to the surface of the carbon fibers constituting the carbon paper, and that these LDH platy particles were connected to one another.

The porosity of the obtained outermost catalyst layer was measured by the mercury intrusion method and found to be 76%.
(2) Joining of Outermost Catalyst Layer and LDH Separator 5% by weight of carbon powder (Denka Black, manufactured by Denka Co., Ltd.) was added to ethanol (purity 99.5%, manufactured by Kanto Chemical Co., Inc.) and the mixture was dispersed by ultrasonic waves to prepare a carbon slurry. The LDH separator obtained in Example A1 was coated with the obtained slurry by spin coating, and then the outermost catalyst layer (air electrode layer) was placed. A weight was placed on the outermost catalyst layer and dried in the air at 80° C. for 2 hours. In this way, the outermost catalyst layer (thickness 200 µm) as an air electrode layer was formed on the LDH separator. At this time, an interface layer (thickness of 0.2 µm) containing LDH platy particles (derived from the LDH separator) and carbon (derived from the carbon slurry) was simultaneously formed between the LDH separator and the air electrode layer. Namely an air electrode/separator assembly was obtained.

(3) Assembly and Evaluation of Evaluation Cells

A metal zinc plate was laminated as a negative electrode on the LDH separator side of the air electrode/separator assembly. The obtained laminate was sandwiched between the holding jigs with a sealing member firmly bitten on the outer circumferential portion of the LDH separator, and the resultant was firmly fixed with screws. This holding jig had an oxygen inlet on the air electrode side and an injection port on the metal zinc plate side, through which the electrolyte was introduced. A 5.4 M KOH aqueous solution saturated with zinc oxide was added to the negative electrode side portion of the assembly thus obtained to fabricate an evaluation cell.

Using an electrochemical measuring device (HZ-Pro S12 manufactured by Hokuto Denko Corporation), the charge/discharge characteristics of the evaluation cell were determined under the following conditions:

Air electrode gas: Water vapor saturation (25° C.) oxygen (flow rate of 200 cc/min)

Charge/discharge current density: 2 mA/cm$^2$

Charge/discharge time: 10 minutes charge/10 minutes discharge

Figure 7:
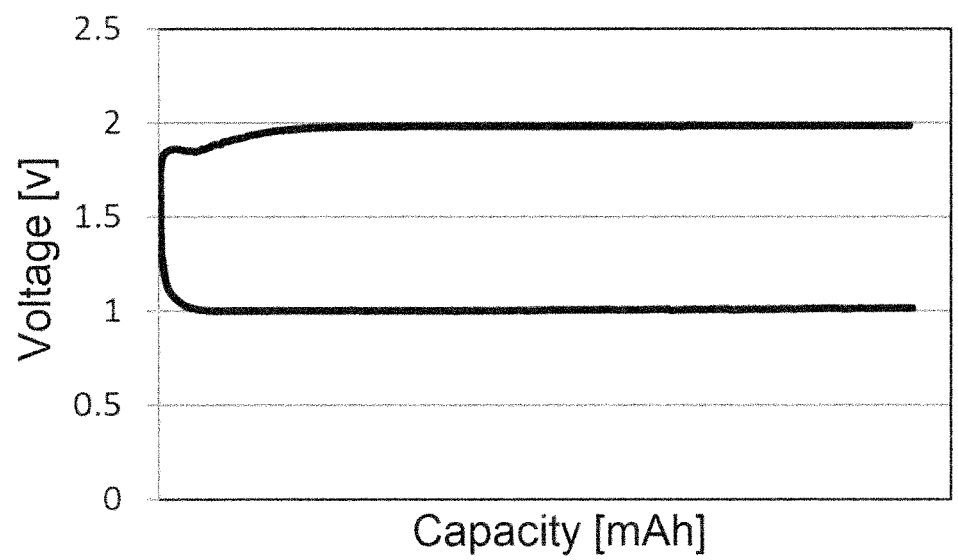
FIG. 7 is a charge/discharge curve measured for the evaluation cell fabricated in Example B1.
Figure 8:
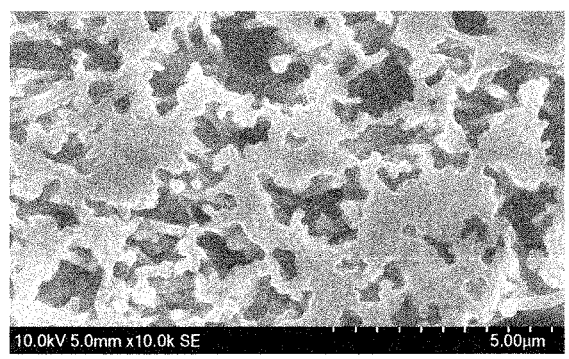
FIG. 8 is an SEM image when observing a cross-sectional microstructure of the internal catalyst layer fabricated in Example B2.

The results were as shown in FIG. 7. Although the evaluation cell (zinc-air secondary battery) fabricated in the present example has the configuration in which no electrolyte is present in the air electrode layer (hence, the resistance tends to be high in nature.), it is found from FIG. 7 that the difference between the charge voltage and the discharge voltage is as small as about 1.0 V (i.e., the resistance is low), and that high charge/discharge efficiency can be realized.

Example B2

An air electrode/separator assembly having three layers of an interface layer, an internal catalyst layer and an outermost catalyst layer on the LDH separator fabricated in Example A1 was fabricated by the following procedure and was evaluated.

(1) Fabrication of Outermost Catalyst Layer

The outermost catalyst layer was fabricated in the same manner as in (1) of Example B1.

(2) Fabrication of Internal Catalyst Layer

To 19 parts by weight of LDH powder (Ni—Fe-LDH powder fabricated by the solgel method) and 20 parts by weight of carbon nanotubes (VGCF®-H, manufactured by Showa Denko K.K.), 11 parts by weight of a butyral resin and 50 parts by weight of a butyl carbitol were added, and the mixture was kneaded with a three-roll mill to prepare a paste. The surface of the LDH separator fabricated in Example A1 was coated with the paste by screen printing to form an internal catalyst layer.

(3) Fabrication of Air Electrode Layer

The outermost catalyst layer prepared in (1) above was placed on the internal catalyst layer formed in (2) above before the paste (internal catalyst layer) was dried. The resultant was dried with a weight placed thereon in the air at 80° C. for 30 minutes. In this way, an air electrode layer composed of an internal catalyst layer (thickness of 10 µm) and an outermost catalyst layer (thickness of 200 µm) was formed on the LDH separator. At this time, an interface layer (thickness 0.2 µm) containing LDH platy particles (derived from the LDH separator), LDH powder (derived from the internal catalyst layer) and carbon nanotubes was simultaneously formed between the LDH separator and the air electrode layer. Namely an air electrode/separator assembly was obtained. When the cross-sectional microstructure of the obtained internal catalyst layer was observed by SEM, the image shown in FIG. 9 was obtained.

When the porosity and the average pore diameter of the internal catalyst layer in the obtained air electrode/separator assembly were measured as follows, the porosity was 48% and the average pore diameter was 1.34 µm.

(Measurement of Porosity and Average Pore Diameter)

The air electrode/separator assembly was cross-sectionally polished with a cross-section polisher (CP), and images of two fields of vision of the cross-section of the internal catalyst layer were acquired with a SEM (JSM-6610LV, manufactured by JEOL Ltd.) at a magnification of 10,000×. On this image data, an image analysis software (Image-J) was used to binarize the images. Porosity values and pore diameter values of pores of the two fields of vision were calculated, and the average values thereof were taken as the porosity and average pore diameter of the internal catalyst layer, respectively.

(4) Assembly and Evaluation of Evaluation Cells

Figure 9:
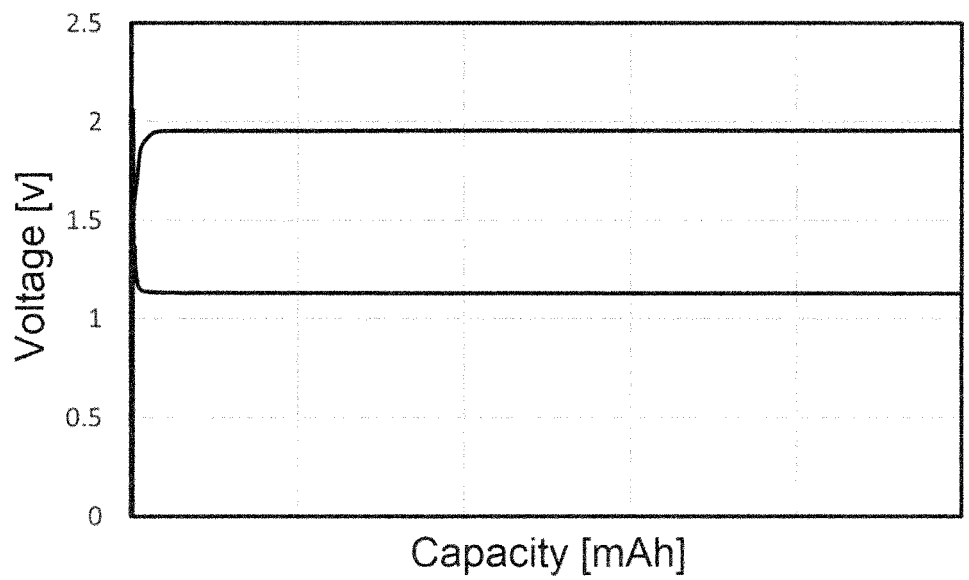
FIG. 9 is a charge/discharge curve measured for the evaluation cell fabricated in Example B2.

The evaluation cell was assembled, and the charge/discharge characteristics were evaluated in the same manner as in (3) of Example B1. The results were as shown in FIG. 9. Although the evaluation cell (zinc-air secondary battery) fabricated in the present example has a configuration in which no electrolyte is present in the air electrode layer (hence, the resistance tends to be high in nature.), it is found from FIG. 9 that the difference between the charge voltage and the discharge voltage is as small as about 0.8 V (i.e., the resistance was low.), and that high charge/discharge efficiency can be realized. In particular, the difference of about 0.8 V between the charge voltage and the discharge voltage is smaller than the difference between the charge voltage and the discharge voltage (about 1.0 V) in the evaluation cell of Example B1, which has no internal catalyst layer, and it is thus found that higher charge/discharge efficiency can be realized by sandwiching the internal catalyst layer between the interface layer and the outermost catalyst layer.

Example B3 (Comparison)

Figure 10:
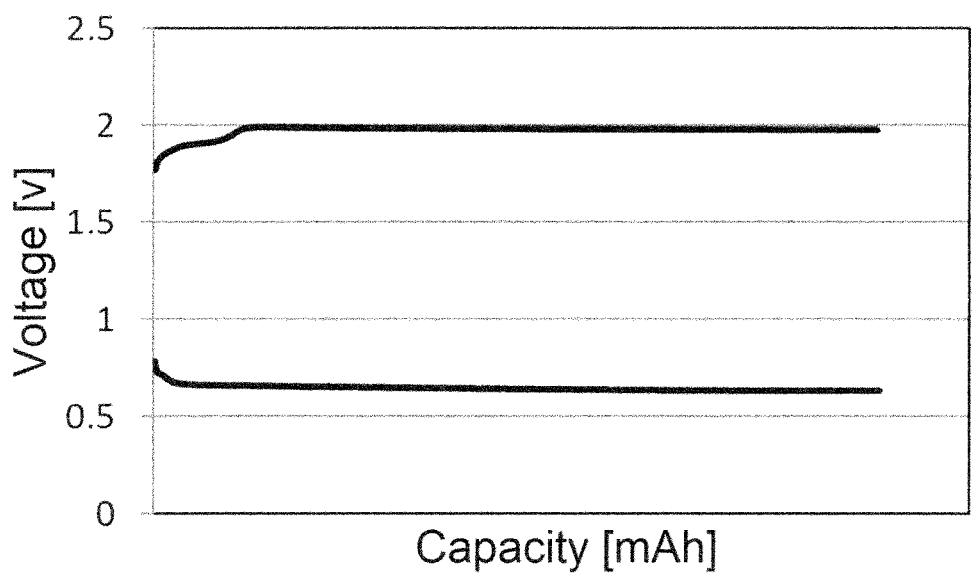
FIG. 10 is a charge/discharge curve measured for the evaluation cell fabricated in Example B3 (comparison).

An air electrode/separator assembly having two layers of an interface layer and an internal catalyst layer on the LDH separator was fabricated in the same manner as in Example B2 except that the outermost catalyst layer was not formed, and the evaluation of the assembly was carried out. The results were as shown in FIG. 10. It is found from FIG. 10 that the evaluation cell (zinc-air secondary battery) fabricated in the present example, which has a configuration without the external catalyst layer, has a difference between the charge voltage and the discharge voltage as large as about 1.4 V (i.e., the resistance is high.), and is inferior in the charge/discharge efficiency to the evaluation cells of Examples B1 and B2, which have a configuration with the external catalyst layer.

Example B4

An air electrode/separator assembly having three layers of an interface layer, an internal catalyst layer, and an outermost catalyst layer on the LDH separator was fabricated in the same manner as in Example B2 except that the outermost catalyst layer ((1) above) was fabricated as follows, and the evaluation of the assembly was carried out.

(Fabrication of Outermost Catalyst Layer)

Raw materials were provided, including nickel chloride hexahydrate ($NiCl_2 \cdot 6H_2O$, manufactured by Kojundo Chemical Laboratory Co., Ltd.), iron chloride hexahydrate ($FeCl_3 \cdot 6H_2O$, manufactured by Kanto Chemical Co., Inc.), vanadium chloride ($VCl_3$, manufactured by Kishida Chemical Co., Ltd.), ultra-pure water ($H_2O$, produced by using a Merck Millipore Milli-Q Advantage apparatus), ethanol ($C_2H_5OH$, manufactured by Kanto Chemical Co., Inc.), acetylacetone ($CH_3COCH_2COCH_3$, manufactured by Kanto Chemical Co., Inc.), and propylene oxide ($C_3H_6O$, manufactured by Kanto Chemical Co., Inc.). 5 ml of ultrapure water and 7.5 ml of ethanol were placed in an airtight container and mixed. 12.5 mmol of nickel chloride hexahydrate, 1.25 mmol of iron chloride hexahydrate, and 5 mmol of vanadium chloride were weighed, placed in a beaker and stirred to obtain a solution in which the metal salts were dissolved. After adding 650 μl of acetylacetone to the obtained solution and stirring for 30 minutes, 6.55 ml of propylene oxide was added and the mixture was stirred for 1 minute. Carbon paper was immersed in the mixture, and the container was sealed. The mixture was allowed to stand undisturbed at room temperature for 24 hours as it was to obtain a substrate supporting a catalyst (Ni—Fe—V-LDH) as the outermost catalyst layer. The porosity of the obtained outermost catalyst layer was measured by the mercury intrusion method and found to be 62%.

Evaluation Results

Figure 11:
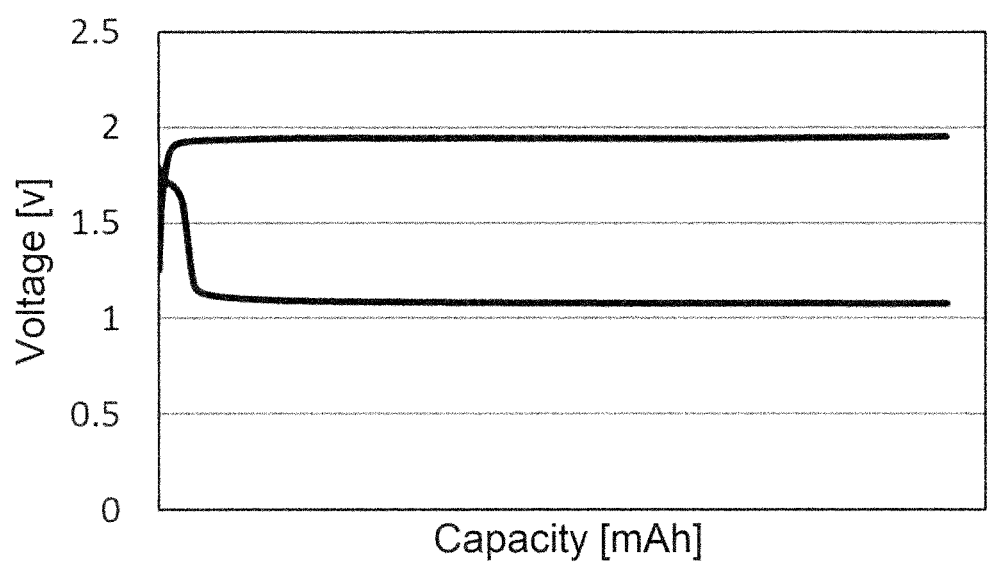
FIG. 11 is a charge/discharge curve measured for the evaluation cell fabricated in Example B4.

The results were as shown in FIG. 11. Although the evaluation cell (zinc-air secondary battery) fabricated in the present example has a configuration in which no electrolyte is present in the air electrode layer (hence, the resistance tends to be high in nature.), it is found from FIG. 11 that the difference between the charge voltage and the discharge voltage is as small as about 0.8 V (i.e., the resistance is low.), and that high charge/discharge efficiency can be realized. In particular, the difference of about 0.8 V between the charge voltage and the discharge voltage is smaller than the difference between the charge voltage and the discharge voltage (about 1.0 V) in the evaluation cell of Example B1, which has no internal catalyst layer, and it is thus found that higher charge/discharge efficiency can be realized by sandwiching the internal catalyst layer between the interface layer and the outermost catalyst layer.

What is claimed is:

1. An air electrode/separator assembly comprising a hydroxide ion conductive dense separator and an air electrode layer provided on one side of the hydroxide ion conductive dense separator, wherein the air electrode layer comprises:
   an internal catalyst layer provided closer to the hydroxide ion conductive dense separator and filled with a mixture comprising a hydroxide ion conductive material, an electron conductive material, an organic polymer, and an air electrode catalyst, provided that the hydroxide ion conductive material may be the same material as the air electrode catalyst, and provided that the electron conductive material may be the same material as the air electrode catalyst, and
   an outermost catalyst layer provided away from the hydroxide ion conductive dense separator, composed of a porous current collector and a layered double hydroxide (LDH) covering the surface thereof, and having a porosity of 60% or more.

2. The air electrode/separator assembly according to claim 1, wherein the LDH has a form of a plurality of LDH platy particles in the outermost catalyst layer, and the plurality of LDH platy particles are bonded vertically or obliquely to a surface of the porous current collector.

3. The air electrode/separator assembly according to claim 2, wherein the plurality of LDH platy particles are connected to one another in the outermost catalyst layer.

4. The air electrode/separator assembly according to claim 1, wherein the porous current collector is composed of at least one selected from the group consisting of carbon, nickel, stainless steel, and titanium.

5. The air electrode/separator assembly according to claim 1, wherein the porous current collector has a thickness of 0.1 to 1 mm.

6. The air electrode/separator assembly according to claim 1, wherein the internal catalyst layer has a porosity of 30 to 50% and an average pore diameter of 5 μm or less.

7. The air electrode/separator assembly according to claim 1, wherein the hydroxide ion conductive material included in the internal catalyst layer is an LDH and/or an LDH-like compound,
   the electron conductive material included in the internal catalyst layer is at least one selected from the group consisting of electron conductive ceramics and carbon materials, and
   the air electrode catalyst included in the internal catalyst layer is at least one selected from the group consisting of LDHs and other metal hydroxides, metal oxides, metal nanoparticles, and carbon materials.

8. The air electrode/separator assembly according to claim 1, further comprising an interface layer comprising a hydroxide ion conductive material and an electron conductive material between the hydroxide ion conductive dense separator and the air electrode layer.

9. The air electrode/separator assembly according to claim 8, wherein the hydroxide ion conductive material included in the interface layer has a form of a plurality of platy particles, and the plurality of platy particles are bonded vertically or obliquely to a main surface of the hydroxide ion conductive dense separator.

10. The air electrode/separator assembly according to claim 8, wherein the hydroxide ion conductive material included in the interface layer is the same type of material as a hydroxide ion conductive material included in the hydroxide ion conductive dense separator.

11. The air electrode/separator assembly according to claim 10, wherein the hydroxide ion conductive material included in the interface layer and a hydroxide ion conductive material included in the hydroxide ion conductive dense separator are both LDHs and/or LDH-like compounds.

12. The air electrode/separator assembly according to claim 8, wherein the electron conductive material included in the interface layer comprises a carbon material.

13. The air electrode/separator assembly according to claim 12, wherein the carbon material is at least one selected from the group consisting of carbon black, graphite, carbon nanotubes, graphene, and reduced graphene oxide.

14. The air electrode/separator assembly according to claim 1, wherein the hydroxide ion conductive dense separator is a layered double hydroxide (LDH) separator.

15. The air electrode/separator assembly according to claim 14, wherein the LDH separator is composited with a porous substrate.

16. A metal-air secondary battery comprising the air electrode/separator assembly according to claim 1, a metal negative electrode, and an electrolyte, wherein the electrolyte is separated from the air electrode layer by the hydroxide ion conductive dense separator interposed therebetween.

* * * * *